(12) United States Patent
Eickhoff et al.

(10) Patent No.: US 10,320,007 B2
(45) Date of Patent: Jun. 11, 2019

(54) FUEL CELL HAVING OXYGEN SELECTIVE MEMBRANE

(71) Applicant: Honeywell International Inc., Morris Plains, NJ (US)

(72) Inventors: Steven J. Eickhoff, Brooklyn Park, MN (US); Jeffrey Michael Klein, Minneapolis, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 155 days.

(21) Appl. No.: 15/221,408

(22) Filed: Jul. 27, 2016

(65) Prior Publication Data
US 2018/0034071 A1 Feb. 1, 2018

(51) Int. Cl.
| | |
|---|---|
| *H01M 8/0239* | (2016.01) |
| *H01M 8/04119* | (2016.01) |
| *H01M 8/04828* | (2016.01) |
| *H01M 8/04746* | (2016.01) |
| *H01M 8/04089* | (2016.01) |
| *H01M 8/2483* | (2016.01) |
| *H01M 8/2484* | (2016.01) |
| *H01M 8/2457* | (2016.01) |
| *H01M 8/2475* | (2016.01) |

(Continued)

(52) U.S. Cl.
CPC ......... *H01M 8/0239* (2013.01); *B01D 63/08* (2013.01); *B01D 69/10* (2013.01); *B01D 71/36* (2013.01); *B01D 71/70* (2013.01); *H01M 8/04089* (2013.01); *H01M 8/04119* (2013.01); *H01M 8/04753* (2013.01); *H01M 8/04761* (2013.01); *H01M 8/04828* (2013.01); *H01M 8/04843* (2013.01); *H01M 8/065* (2013.01); *H01M 8/2457* (2016.02); *H01M 8/2475* (2013.01); *H01M 8/2483* (2016.02); *H01M 8/2484* (2016.02); *B01D 53/228* (2013.01); *B01D 2258/0208* (2013.01); *B01D 2323/46* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2007/0104996 A1* | 5/2007 | Eickhoff | C01B 3/065 429/417 |
| 2011/0027668 A1* | 2/2011 | Bae | C01B 3/065 429/413 |

(Continued)

FOREIGN PATENT DOCUMENTS

| | | |
|---|---|---|
| EP | 1614178 | 1/2006 |
| EP | 2874221 | 5/2015 |
| JP | 07105991 | 4/1995 |

OTHER PUBLICATIONS

Derwent English abstract for JP7-105991 (Year: 1995).*

(Continued)

*Primary Examiner* — Sin J Lee
(74) *Attorney, Agent, or Firm* — Alston & Bird LLP

(57) ABSTRACT

A device includes a container, an oxygen-to-water selectively permeable membrane supported by the container, a chamber disposed in the container to hold a hydrogen generating fuel, and a proton exchange membrane fuel cell supported within the container between the oxygen-to-water selectively permeable membrane and the chamber.

20 Claims, 7 Drawing Sheets

(51) Int. Cl.
*H01M 8/065* (2016.01)
*B01D 71/36* (2006.01)
*B01D 71/70* (2006.01)
*B01D 69/10* (2006.01)
*B01D 63/08* (2006.01)
B01D 53/22 (2006.01)
H01M 8/1018 (2016.01)

(56) References Cited

U.S. PATENT DOCUMENTS

2011/0269030 A1* 11/2011 Moore ................ H01M 2/0255
                        429/403
2015/0132676 A1* 5/2015 Eickhoff ............. H01M 8/0606
                        429/423

OTHER PUBLICATIONS

Machine-assisted English translation for JP7-105991 provided by JPO (Year: 1995).*
"European Application Serial No. 17181818.0, Extended European Search Report dated Jan. 2, 2018", 7 pgs.
Matsushita, Denki Sangyo KK, "Database WPI", Week 199525, Thomson Scientific, London, GB, (Apr. 21, 1995), 1 pg.
Zhang, Jian, et al., "Air Dehydration Membranes for Nonaqueous Lithium-Air Batteries", Journal of the Electromechemical Society, 157 (8), (2010), A940-A946.
Zhang, Jian, et al., "Oxygen-selective immobilized liquid membranes for operation of lithium-air batteries in ambient air", Journal of Power Sources 195 (2010), (2010), 7438-7444.

* cited by examiner

FUEL CELL HAVING OXYGEN SELECTIVE MEMBRANE

BACKGROUND

Current batteries for portable electronic equipment, such as a hand held mobile devices need to be recharged fairly often. With increasing functionality of such equipment, come increasing power demands. The desired portability of the electronic equipment leads to space constraints, further increasing the demands on battery performance. The energy density of existing batteries is proving insufficient to keep pace with the power requirements of portable electronic equipment.

Micro fuel cells may utilize water vapor recovered from hydrogen/air proton electron membrane fuel cells to generate hydrogen via a hydrolysis reaction with a water reactive fuel such as a chemical hydride. A mechanism may be used to regulate the hydrogen generation rate by regulating water vapor provided to the fuel. A membrane type valve has typically been used to regulate water permeation through a membrane based on the pressure difference across the membrane. While such a membrane based water regulation approach works well for relatively low power density fuel cell based power generators, such approaches tend to use a tortuous diffusion path for the water vapor, resulting in a significant increase in thickness or operating temperature to scale to higher power, negatively affecting power generator energy density.

SUMMARY

A device includes a container, an oxygen-to-water selectively permeable membrane supported by the container, a chamber disposed in the container to hold a hydrogen generating fuel, and a proton exchange membrane fuel cell supported within the container between the oxygen-to-water selectively permeable membrane and the chamber.

A further device includes a container having an oxygen-to-water selectively permeable membrane and a chamber to hold a hydrogen generating fuel and a proton exchange membrane fuel cell supported within the container between the oxygen-to-water selectively permeable membrane and the chamber positioned to receive oxygen transported across the oxygen-to-water selectively permeable membrane and hydrogen from the chamber.

A method includes exposing the cathode of a proton exchange membrane fuel cell to oxygen that is transported from ambient across an oxygen-to-water selectively permeable membrane, such that water vapor transport across the oxygen-to-water selectively permeable membrane is limited, providing hydrogen to an anode of the fuel cell from a chamber containing a chemical hydride, reacting the oxygen and hydrogen to produce electricity and water vapor, and providing the generated water vapor to the chemical hydride to cause the chemical hydride to generate more hydrogen.

DETAILED DESCRIPTION

Figure 1:
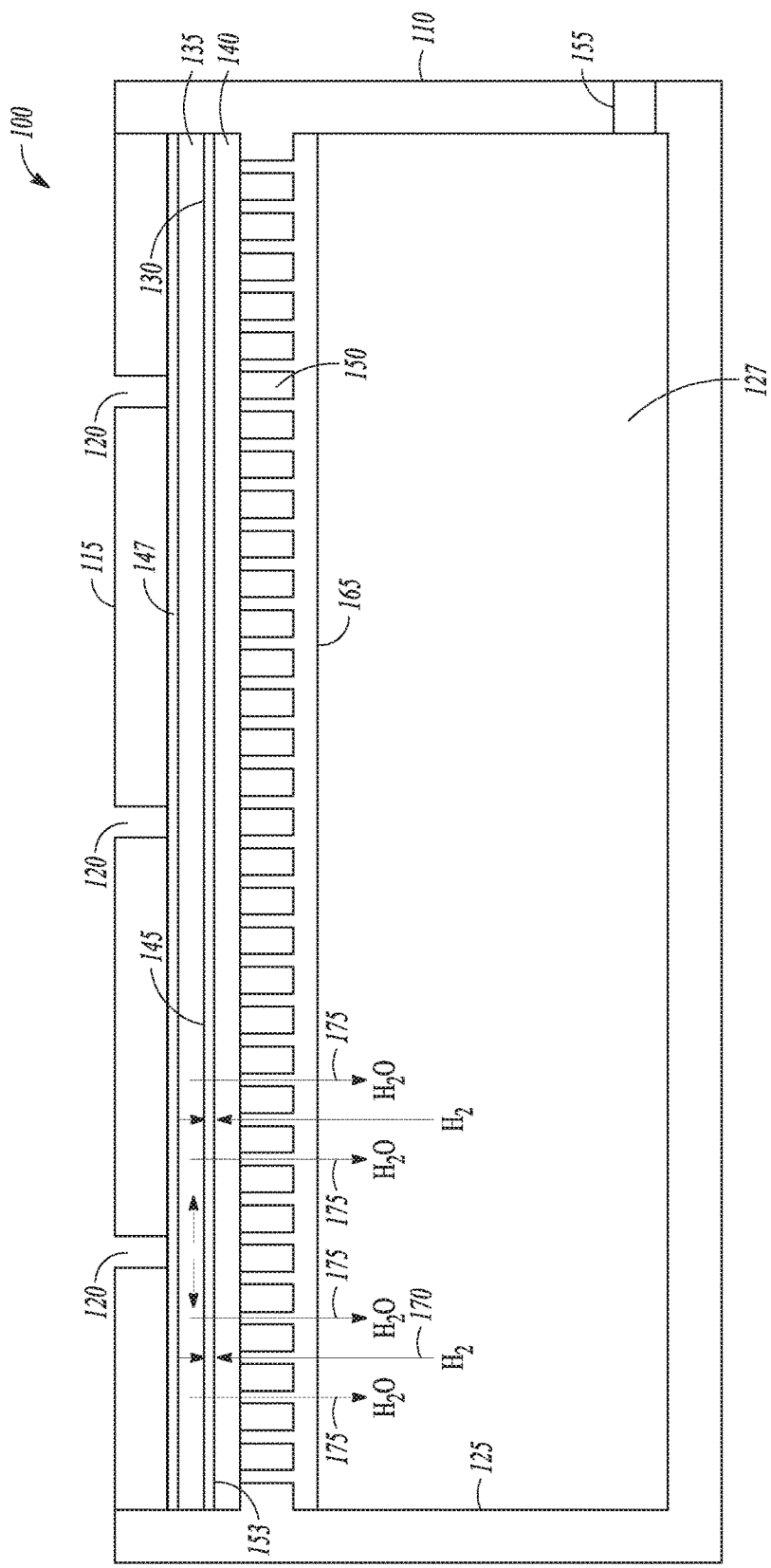
FIG. 1 is a block diagram side cross section of a power generator having an oxygen-to-water selectively permeable membrane according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Some newer fuel cells utilize a highly restricted cathode to control a hydrogen generation rate and enable stable operation without a valve or valves. Cathode conductance may be designed to limit the amount of oxygen flow to the cathode to that which is required for a targeted power level. In doing so, the amount of "excess" water that flows into or out of the fuel cell is reduced, allowing the fuel cell to operate in a stable manner without a valve.

In order to guarantee stable operation when the ambient humidity is less than the cathode humidity (a condition in which water is slowly lost to ambient) the cathode limited fuel cell may contain, in addition to a chemical hydride fuel, a metal hydride material which provides hydrogen (without requiring a reaction with water to generate it) to offset the water lost to ambient.

Metal hydride materials have approximately half the energy density, and 1/10th the specific energy of chemical hydride fuels, and in the interest of achieving high performance (energy density and specific energy) it is desirable to limit the amount of metal hydride in the system, to provide just the amount required for operation under low humidity conditions.

Water gained from the ambient environment (when the cathode humidity is less than the ambient humidity) generates unwanted hydrogen which raises the system pressure, resulting in increased hydrogen permeation losses which balance (on a molar ratio) the water gained. The extra water gained thus results indirectly in reduced performance (energy density and specific energy). It is therefore desirable to limit water gained from ambient.

A means to limit water loss (or gain) is provided without impacting the flow of oxygen to the cathode. The use of such a means enables reduction in the amount of metal hydride in the fuel cell and an increase in higher performing chemical hydride fuel. Less hydrogen is lost, improving fuel cell system performance. In one embodiment, the means to limit water loss comprises an oxygen-to-water selectively permeable membrane positioned at the fuel cell cathode. The oxygen-to-water selectively permeable membrane reduces the amount of water lost to (or gained from) ambient, resulting in improved performance and enabling an overall increase in fuel cell based power generator energy density and specific energy.

FIG. 1 is a block diagram cross section view of a power generator 100. Power generator 100 may include a container 110 having a top plate 115 containing an array of holes, which in one embodiment may be oxygen limiting pinholes 120. The container forms a chamber 125 to hold a chemical hydride fuel 127, which may also contain a relatively small amount of a metal hydride material in some embodiments to provide hydrogen during times of low water vapor availability.

A fuel cell membrane electrode assembly 130 is supported within the container between the top plate 115 and the chamber 125. The membrane electrode assembly 130 comprises a proton exchange membrane coated on both sides with catalyst electrode, the catalyst electrode may be patterned in various embodiments.

A first, gas diffusion layer 135 is supported between the fuel cell proton exchange membrane electrode assembly 130 and the top plate 115. A second gas diffusion layer 140 is supported between the membrane electrode assembly 130 and the chamber 125. The gas diffusion layers may comprise porous carbon fiber or carbon paper, and may include a micro porous layer on the side facing the membrane electrode assembly.

Figure 2:
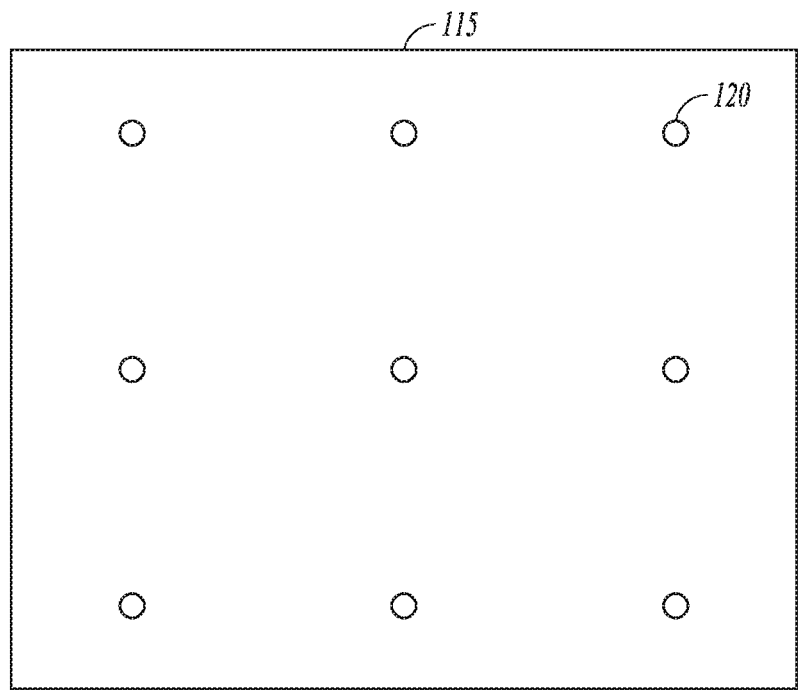
FIG. 2 is a top view of a top plate of the power generator of FIG. 2 illustrating an array of pinholes according to an example embodiment.

The array of oxygen limiting pinholes 120, shown in a top view of top plate 115 in FIG. 2, may be sized to limit oxygen supplied to a cathode side 145 of the fuel cell proton exchange membrane electrode assembly 130.

An oxygen-to-water selectively permeable membrane 147 is positioned between ambient and the cathode side 125 of the proton exchange membrane electrode assembly 130. In FIG. 1, the oxygen-to-water selectively permeable membrane 147 is positioned between the top plate 115 and gas diffusion layer 135, enabling oxygen to flow through the pinholes 120, and resisting the flow of water vapor, both from ambient toward the cathode side 145 and from the cathode side toward ambient. In further embodiments, the oxygen-to-water selectively permeable membrane 147 may be supported on an ambient exposed side of the top plate 115, or sandwiched in the middle of the top plate 115, which may be split in two pieces with matching pinholes as shown in a later figure.

The oxygen-to-water selectively permeable membrane in one embodiment comprises a porous film, such as polytetrafluorethylene (PTFE), or a porous metal sheet. An $O_2$ selective liquid may be mobilized into the film. The $O_2$ selective liquid may be a silicone oil, such as polydimethylsiloxane or dimethylpolysiloxane, or combinations thereof. The porous film may have pore structures that have micrometer and sub-micrometer size. In further embodiments, means of providing an oxygen-to-water selectively permeable membrane may use other materials now known or hereinafter developed.

In one embodiment, the oxygen limiting pinholes have a size corresponding to a design point to provide an average power of a selected load, such as for example 500 mW. Note that in some embodiments, the oxygen-to-water selectively permeable membrane 147 may replace the function of the pinholes to regulate the power provided. In such embodiments, the pinholes may have a size and density suitable for supporting the membrane, which may have selectivity values greater than 4. The pinholes 120, in addition to the oxygen-to-water selectively permeable membrane 147 may also serve to limit the amount of water vapor provided to the power generator from ambient atmosphere. Limiting the water vapor from ambient may have an added benefit of reducing the power generator operating pressure under hot and humid conditions, as less water reaches the fuel, limiting over production of hydrogen from the fuel.

Water vapor produced by the chemical reaction of the hydrogen and oxygen at the fuel cell proton exchange membrane electrode assembly 130 cathode side 145 is provided back to the fuel as indicated by arrows 175 and is sufficient to keep the power generator generating the design point average power.

Some loads may include energy storage devices, such as a super capacitor or a rechargeable battery, which may be charged utilizing the average power provided by the power generator. The load may use the stored energy for providing pulses of higher power, such as when transmitting sensed values in the case of the load being a wireless sensor.

In some embodiments, the fuel cell reaction utilizes 0.5 moles of hydrogen per mole of water produced. The O2 concentration in air (ambient) is approximately 20%, and the water concentration typically ranges from 1-2% resulting in an oxygen to water ratio of 10 to 20×. Given these parameters, the size and density of the pinholes in the top plate 115 that provide oxygen to the cathode may be easily designed for a known average power level. With the use of the oxygen-to-water selectively permeable membrane 147, the water ratio becomes less relevant in determining the size and density of the pinholes 120. The pinholes may have a round cross section in one embodiment, or may be any shape desired and may be formed by laser cutting, punching, molding, or other means. Example hole numbers for various temperatures and power levels are shown in the following TABLE 1:

TABLE 1

Number of 0.003 mil diameter holes in a 0.006 mil thick top plate, for various temperatures and power levels.

| Temperature °C. | Number of 3 mil holes for 0.5 W | Number of 3 mil holes for 1 W | Number of 3 mil holes for 1.5 W |
| --- | --- | --- | --- |
| 0 | 1124 | 2248 | 3372 |
| 10 | 1094 | 2188 | 3282 |
| 20 | 1066 | 2132 | 3198 |
| 30 | 1040 | 2080 | 3120 |
| 40 | 1015 | 2030 | 3045 |

The oxygen limiting pinholes in one embodiment may be coupled to ambient atmosphere to obtain exposure to oxygen. The oxygen-to-water selectively permeable membrane 147 and to some extent, the pinholes, restrict water vapor from ambient atmosphere such that oxygen is the primary regulator of electricity generated by the fuel cell proton exchange membrane. The oxygen limiting pinholes in one embodiment, may be configured to regulate oxygen provided to the cathode of the fuel cell proton exchange membrane electrode assembly to control electricity generated. By placing the pinholes in the top plate, between ambient and the first gas diffusion layer and the cathode side of the fuel cell proton exchange membrane electrode assembly, a very short diffusion path for oxygen is provided. This may also allow the fuel cell portion of the power generator to be made fairly thin, since additional paths for flow of oxygen, water vapor, or hydrogen may be reduced or eliminated.

In one embodiment, the cathode layer is continuous across the power generator with the pinholes positioned uniformly to distribute oxygen to the cathode layer. In the case of a patterned cathode layer, the pin holes may be aligned or centered over each cathode pattern to facilitate oxygen distribution. In some embodiments, the top plate may contain channels adjacent the first diffusion layer extending from the pin holes to assist in distributing oxygen from the pin holes to the cathode layer. In other embodiments, the first diffusion layer provide sufficient oxygen distribution.

In one embodiment, a perforated support plate 150 is supported by the container 110 between the second diffusion layer 140 and the bottom chamber 125. The perforated support plate 150 contains perforation to allow unrestricted flow of hydrogen and water vapor between the fuel in the chamber 125 and the second diffusion layer 140 which is adjacent an anode 153 side of the proton exchange membrane. Suitable adhesives may be used to adhere the various fuel cell layers together in some embodiments, or the layers may simply be supported between the top plate 115 and support plate 150. In various embodiments, the container and plates may be formed of metal, polymer, or other materials that are compatible with the fuel cell, chemical fuel, and membrane materials.

In a further embodiment, a hydrogen pressure relief valve 155 is supported by the container and is located in the chamber to provide a pressure relief path to ambient to vent hydrogen when the pressure within the chamber exceeds a selected threshold. Valve 155 may open to vent the hydrogen if more hydrogen is produced than can be consumed by the fuel cell. Ambient conditions or lower energy demand by a load may contribute to excess hydrogen being produced resulting in a pressure that exceeds the pressure threshold of the valve 155.

In one embodiment, the chamber 125 may be filled with the chemical hydride fuel 127, a primary water reactive hydrogen producing fuel, separated from the fuel cell proton exchange membrane electrode assembly by a particulate filter 165. Many different chemical hydrides may be used for the hydrogen producing fuel, such as for example AlH3, LiAlH4, LiH, NaAlH4, CaH2, and NaH as well as others in various embodiments. Fuel including Li may provide for desirable recycling of spent fuel blocks, which in some embodiments are replaceable in the power generator. The fuel may be formed with an engineered particle size, distribution, and controlled density. For example, the fuel may be formed in a hydraulic press with a die, and contain particle sizes in the range of 1 to 100 μm. In one embodiment, the size of the particles may be between 5 to 10 μm. The particles may all be the same size, or may have different ranges of particle sizes within one or more of the above ranges. In one embodiment, particle sizes outside of the above ranges are limited so as to not adversely affect performance of hydrogen generation and utilization of the fuel.

In further embodiments, a metal hydride material may be included for use in generating hydrogen when insufficient water vapor is available to meet load demands. Some example metal hydrides that may be reversed or recharged with hydrogen include LaNi5H5, FeTiH2, Mg2NiH4, and TiV2H4.

In one embodiment, the hydrogen-generating fuel composition can include both a metal hydride (e.g., an interstitial intermetallic hydride, such as LaNi5-xAlx wherein x is about 0 to about 1), and a chemical hydride (e.g., an ionic hydride or a covalent hydride, such as magnesium hydride (MgH2), lithium hydride (LiH), aluminum hydride (AlH3), calcium hydride (CaH2), sodium aluminum hydride (NaAlH4), sodium borohydride (NaBH4), lithium aluminum hydride (LiAlH4), ammonia borane (H3NBH3), diborane (B2H6), palladium hydride. LaNi5H6, TiFeH2, and a combination thereof). In some embodiments, the hydrogen-generating composition can include a uniform blend of the chemical hydride, the metal hydride, and the Lewis acid. In some embodiments, the hydrogen-generating composition can include the metal hydride separate from a mixture of the chemical hydride and the Lewis acid, such as a fuel pellet including a metal hydride and a different fuel pellet including an intimate mixture of a chemical hydride and a Lewis acid.

The Lewis acid can be any suitable Lewis acid, such that the hydrogen-generating composition can be used as described herein. The Lewis acid can be an inorganic compound or an organometallic compound in which a cation of the Lewis acid is selected from the group consisting of scandium, titanium, vanadium, chromium, manganese, iron, cobalt, copper, zinc, boron, aluminum, yttrium, zirconium, niobium, molybdenum, cadmium, rhenium, lanthanum, erbium, ytterbium, samarium, tantalum, and tin. The anion of the Lewis acid can be a halide.

The Lewis acid can be chosen from aluminum chloride (AlCl3), aluminum bromide (AlBr3), aluminum fluoride (AlF3), stannous (II) chloride (SnCl2), stannous (II) bromide (SnBr2), stannous (II) fluoride (SnF2), magnesium chloride (MgCl2), magnesium bromide (MgBr2), magnesium fluoride (MgF2), zirconium (IV) chloride (ZrCl4), zirconium (IV) bromide (ZrBr4), zirconium (IV) fluoride (ZrF4), tungsten (VI) chloride (WCl6), tungsten (VI) bromide (WBr6), tungsten (VI) fluoride (WF6), zinc chloride (ZnCl2), zinc bromide (ZnBr2), zinc fluoride (ZnF2), ferric (III) chloride (FeCl3), ferric (III) bromide (FeBr3), ferric (III) fluoride (FeF3), vanadium (III) chloride, vanadium (III) bromide, vanadium (III) fluoride, and a combination thereof. The Lewis acid can be chosen from aluminum chloride (AlCl3), magnesium chloride (MgCl2), zirconium (IV) chloride (ZrCl4), and a combination thereof. The Lewis acid can be zirconium (IV) chloride (ZrCl4).

Hydrogen generated in the fuel cartridge is transported to, as indicated by arrows 170, and consumed at the anode side 153 of the fuel cell, while oxygen in the ambient airflow through the pin holes is consumed at cathode side 145 of the fuel cell proton exchange membrane electrode assembly 130. The fuel cell produces water vapor and heat when reacting the hydrogen and oxygen, as well as electricity. Some of the water vapor generated at the cathode side 145 may proceed back to the fuel cartridge as indicated by arrows 175 for use in generating more hydrogen.

Figure 3:
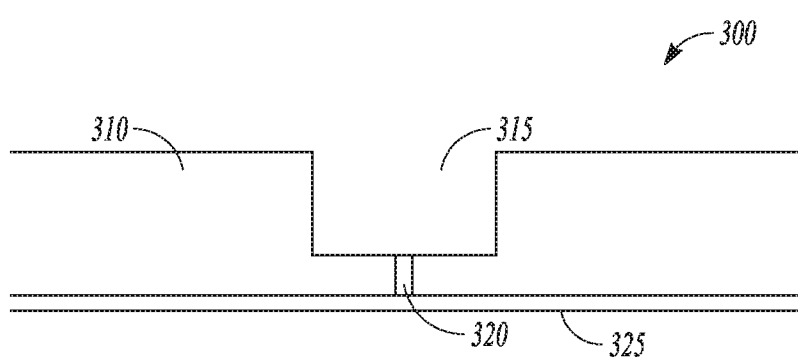
FIG. 3 is a block diagram cross section of a top plate opening with a pinhole and oxygen-to-water selectively permeable membrane according to an example embodiment.

FIG. 3 is a cross section illustrating an alternative pinhole arrangement at 300 in a top plate 310. Top plate 310 may contain an array of openings exposed to ambient, one of which is indicated at 315. The openings 315 extend partially through the top plate. A pinhole 320 may be formed in a bottom of one or more of the openings 315. The openings 315 have a larger cross section than the pinholes 320. The larger cross section may be useful in preventing fouling of the oxygen path, which might be problematic in some operating environments for pinholes extending all the way through the top plate 310. Fouled pinholes would result in reduce power generation as oxygen flow would be further constrained. By reducing the length of the pinhole to a shorter distance, fouling is less likely. An oxygen-to-water selectively permeable membrane 325 is included adjacent the pinhole 320 in one embodiment.

In further embodiments many more rows and columns of pinholes may be provided and may be distributed in different patterns than that shown. While the pinholes in one embodiment are centered on repeating patterns of membrane electrode assemblies, they may be dispersed in different patterns themselves. In some embodiments, multiple pinholes may be distributed about each repeating pattern of membrane electrode assemblies. The membrane electrode assemblies may also be formed of different patterns, which need not be uniform. In one embodiment, the total cross sectional area of all the pinholes is selected to meet the average power requirements of an expected load.

Figure 4:
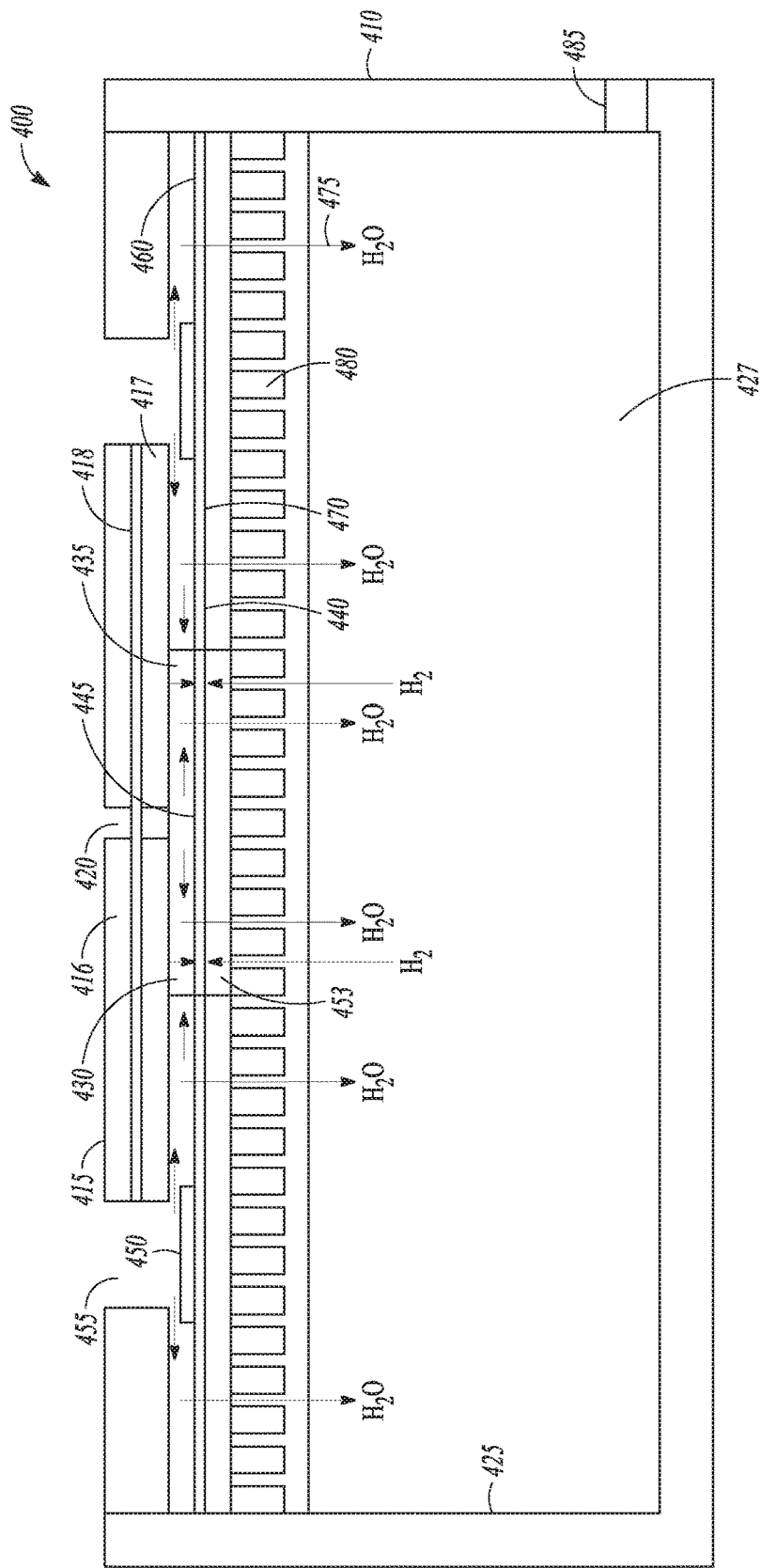
FIG. 4 is a block diagram side cross section of a power generator having pinhole openings, oxygen-to-water selectively permeable membranes, and pressure responsive valve assemblies illustrated in an open position to regulate oxygen flow according to an example embodiment.

FIG. 4 is a block diagram cross section view of a power generator 400. Power generator 400 may include a container 410 having a top plate 415 that has a portion that is divided into a top portion 416 and bottom portion 417 sandwiching an oxygen-to-water selectively permeable membrane 418. The top plate portions contain aligned arrays of oxygen limiting pinholes 420. The portion of the top plate that contains the oxygen-to-water selectively permeable membrane 418 corresponds to each portion that contains a pinhole. Oxygen travelling through the pinholes also traverses the oxygen-to-water selectively permeable membrane 418. The container forms a chamber 425 to hold a chemical hydride fuel 427.

A fuel cell proton exchange membrane electrode assembly 430 is supported within the container between the top plate 415 and the chamber 425. A first gas diffusion layer 435 is supported between the fuel cell proton exchange membrane electrode assembly 430 and the top plate 415. A second gas diffusion layer 440 is supported between the fuel cell proton exchange membrane electrode assembly 430 and the chamber 425. The gas diffusion layers may comprise porous carbon fiber or carbon paper, and may include a micro porous layer on the side facing the membrane electrode assembly.

In one embodiment, the membrane electrode layer 430 may be fully catalyzed or selectively patterned. The membrane electrode layer 430 in one embodiment is patterned and positioned under each pinhole 420 to receive oxygen sufficient to generate an average energy requirement of an attached load. Additional oxygen and water vapor to facilitate generation of additional energy for the load during increased needs of the load may be provided via a combination of valve plates 450 and valve openings 455 in the top plate 415. The valve plates 450 may be supported between the membrane electrode assemblies by selectively permeable valve membranes 460 that are permeable to water vapor, but impermeable to hydrogen and oxygen. The valve membranes hold the valve plates 450 in alignment with the valve openings 455 to selectively cover and uncover the openings. The valve membranes 460 flex in response to differences in pressure across the valve membranes 460 to move the valve plates 450 to cover or uncover the openings 455. In one embodiment, the valve membrane 460 may be coupled to various sides of the pattered membrane electrode assembly 430 and optionally to sides of the container 410.

When the pressure in the chamber 425 drops due to increased energy use by the load causing consumption of hydrogen from the chamber 425, the valve membranes 460 flex away from the valve openings 455, as shown in FIG. 4, allowing flow of oxygen and water vapor from ambient through the valve openings 455 to increase. The oxygen flows through an open path between the top plate 415 and valve membrane 460 to the membrane electrode assembly 430 as indicated by arrows 470. The open path extends around each valve plate 450, providing for free flow of oxygen to the patterned membrane electrode assembly 430. The water vapor flows through the valve membrane to the chamber as indicated by arrows 475. The water vapor passes through the valve membrane 460 into the chamber 425 resulting in more hydrogen being produced. The additional oxygen allows the membrane electrode assembly 430 to produce more energy, satisfying the increased demand of the load.

Figure 5:
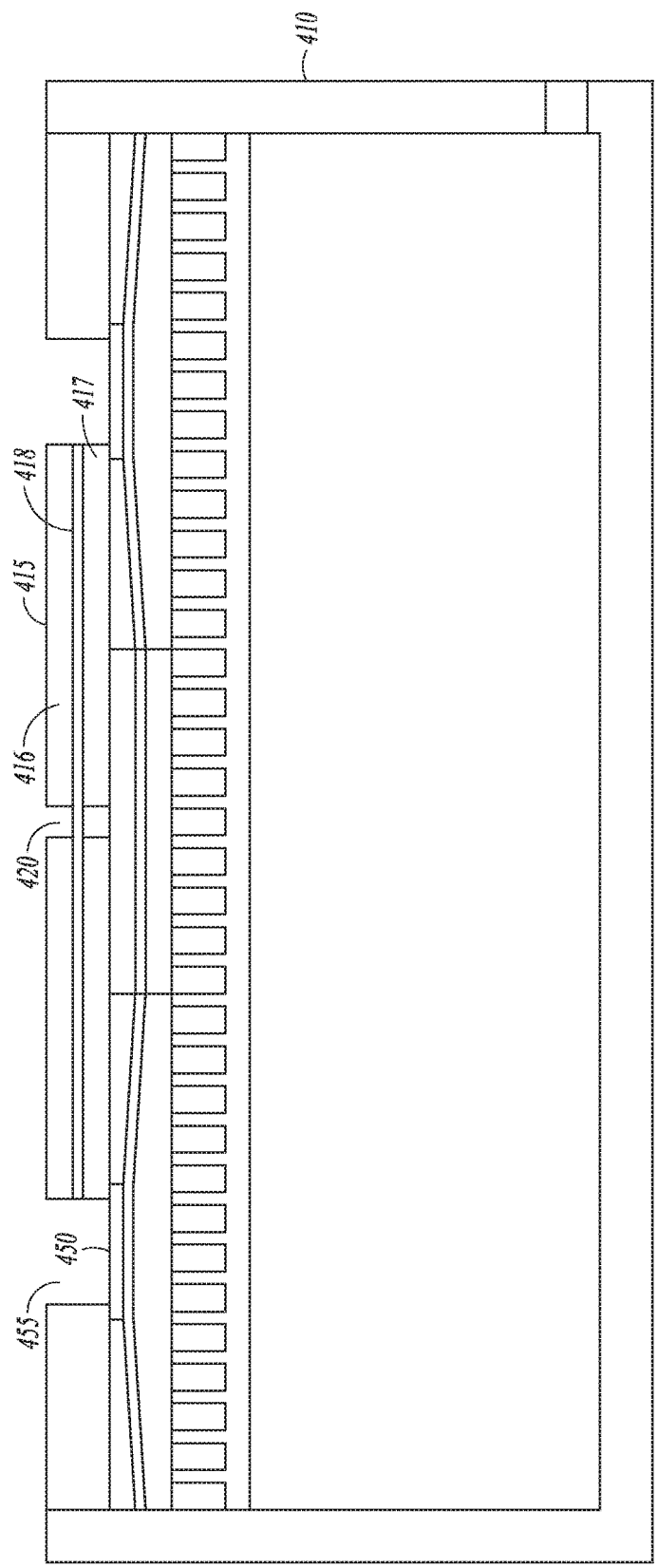
FIG. 5 is a block diagram side cross section of a power generator having pinhole openings, oxygen-to-water selectively permeable membranes, and pressure responsive valve assemblies illustrated in a closed position to regulate oxygen flow according to an example embodiment.

When the load returns to its average consumption level, the pressure in the chamber 425 increases, causing the valve membrane 460 to flex in the direction of the valve openings 455, covering the valve openings 455 with the valve plates 450, which returns the oxygen flow rate to that provided by the pinholes 420. The closed position of the valve plates 450 and valve openings 455 is illustrated in FIG. 5, wherein the numbering is consistent with FIG. 4.

Figure 6:
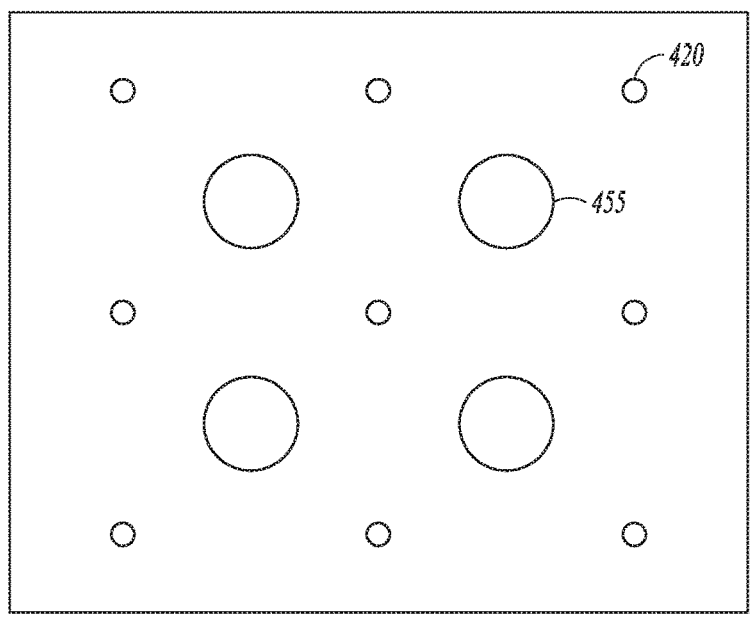
FIG. 6 is a top view of a top plate of the power generator of FIG. 4 illustrating an array of pinholes and valve openings according to an example embodiment.

The array of oxygen limiting pinholes 420, shown in a top view of top plate 415 in FIG. 6, may be sized to limit oxygen supplied to a cathode side 445 of the fuel cell proton exchange membrane electrode assembly 430. In one embodiment, the oxygen limiting pinholes have a size corresponding to a design point to provide an average power of a selected load, such as for example 500 mW. The pinholes, in conjunction with the oxygen-to-water selectively permeable membrane 418 corresponding to each pinhole, may also limit the amount of water vapor provided to the power generator from ambient atmosphere, which may have an added benefit of reducing the power generator operating pressure under hot and humid conditions, as less water reaches the fuel, limiting over production of hydrogen from the fuel. Water vapor produced by the chemical reaction of the hydrogen and oxygen at the fuel cell proton exchange membrane electrode assembly 430 is provided back to the fuel and is sufficient to keep the power generator generating the design point average power.

FIG. 6 also illustrates the valve openings 455 as an array of openings 455 interspersed between the pinholes 420. The example shown in FIG. 6 may be a simplified example embodiment. In further embodiments many more rows and columns of pinholes, corresponding oxygen-to-water selectively permeable membranes 418, and valve openings may be provided and may be distributed in different patterns than that shown. While the pinholes in one embodiment are centered on repeating patterns of membrane electrode assemblies, they may be dispersed in different patterns themselves. In some embodiments, multiple pinholes may be distributed about each repeating pattern of membrane electrode assemblies. The membrane electrode assemblies may also be formed of different patterns, which need not be uniform. In one embodiment, the total cross sectional area of all the pinholes is selected to meet the average power requirements, such as 500 mW, of an expected load, while the total maximum oxygen flow rate provided by the valve plate and valve plate openings when open is selected to meet peak energy requirements of the expected load, such as 1.5 W.

In one embodiment, a perforated support plate 480 is supported by the container 410 between the second diffusion layer 453 and the bottom chamber 425. The perforated support plate 480 contains perforation to allow unrestricted flow of hydrogen and water vapor between the fuel in the chamber 425 and the second diffusion layer 453 which is adjacent an anode 440 side of the proton exchange membrane. Suitable adhesives may be used to adhere the various fuel cell layers together in some embodiments, or the layers may simply be supported between the top plate 415 and support plate 480.

In a further embodiment, a hydrogen pressure relief valve 485 is supported by the container 410 and is located in the chamber 425 to provide a pressure relief path to ambient to vent hydrogen when the pressure within the chamber 425 exceeds a selected threshold. Valve 485 may open to vent the hydrogen if more hydrogen is produced than can be consumed by the fuel cell. Ambient conditions or lower energy demand by a load may contribute to excess hydrogen being produced resulting in a pressure that exceeds the pressure threshold of the valve 485.

Figure 7:
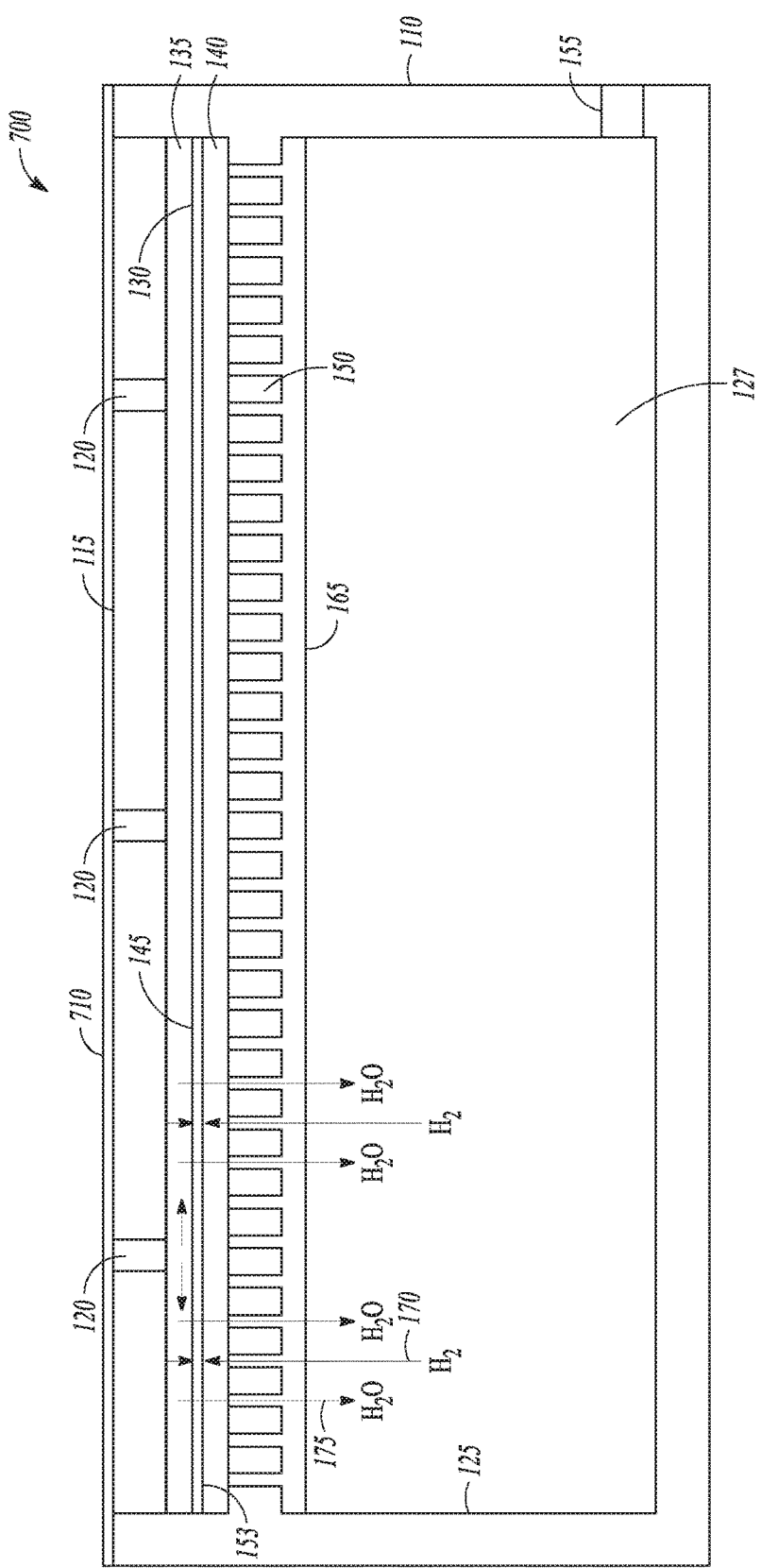
FIG. 7 is a block diagram side cross section of an alternative power generator having an oxygen-to-water selectively permeable membrane according to an example embodiment.

FIG. 7 is a block diagram side cross section of an alternative power generator 700 having an oxygen-to-water selectively permeable membrane according to an example embodiment. The numbering of like elements is consistent with FIG. 1. In one embodiment, an oxygen-to-water selectively permeable membrane 710 is disposed on a top surface of top plate 115. The oxygen-to-water selectively permeable membrane 710 performs the same function as oxygen-to-water selectively permeable membrane 147, but provides an additional benefit of protecting the pinholes 120 from clogging by filtering out particulates.

Figure 8:
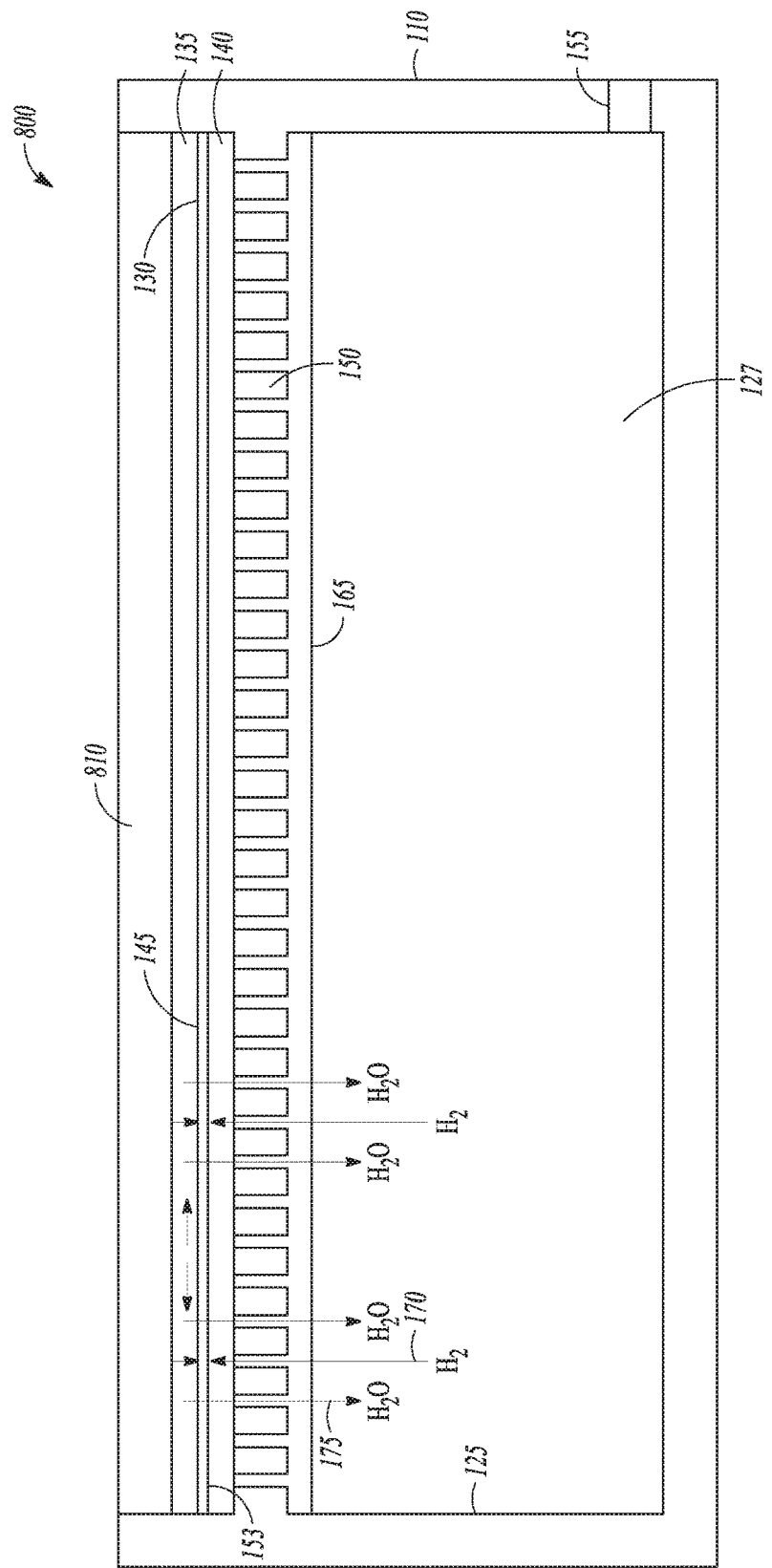
FIG. 8 is a block diagram cross section of a further alternative power generator having an oxygen-to-water selectively permeable membrane according to an example embodiment.

FIG. 8 is a block diagram cross section of an alternative power generator 800 having an oxygen-to-water selectively permeable membrane 810 disposed between ambient and the first diffusion layer 135, wherein the numbering of like parts is consistent with FIG. 1. In this embodiment, the oxygen-to-water selectively permeable membrane 810 also serves as the top plate, and may be affixed to the first diffusion layer 135. In some embodiments, a further protective layer may be added to the oxygen-to-water selectively permeable membrane 810 to protect it from impact, or it may be encapsulated in a further larger container that provide exposure of the oxygen-to-water selectively permeable membrane 810 to ambient such as oxygen can be transported across the oxygen-to-water selectively permeable membrane 810 to the cathode side 145 of the fuel cell proton exchange membrane electrode assembly 130.

EXAMPLES

1. In example 1, a device includes a container, an oxygen-to-water selectively permeable membrane supported by the container, a chamber disposed in the container to hold a hydrogen generating fuel, and a proton exchange membrane fuel cell supported within the container between the oxygen-to-water selectively permeable membrane and the chamber.

2. The device of example 1 wherein the hydrogen generating fuel comprises a chemical hydride and a metal hydride.

3. The device of example 2 wherein the hydrogen generating fuel further comprises a Lewis acid.

4. The device of any of examples 1-3 wherein the oxygen-to-water selectively permeable membrane comprises a porous film loaded with an O2-selective silicone oil.

5. The device of example 4 wherein the porous film comprises polytetrafluoroethylene (PTFE).

6. The device of example 5 wherein the porous film comprises pore structures having micrometer and sub-micrometer size.

7. The device of example 6 wherein the silicone oil comprises polydimethylsiloxane or dimethylpolysiloxane.

8. The device of any of examples 1-7 and further comprising a plate disposed between ambient and the fuel cell proton exchange membrane, the plate having an array of oxygen limiting pinholes sized to limit oxygen supplied to a cathode side of the fuel cell proton exchange membrane electrode assembly.

9. The device of example 8 wherein the oxygen limiting pinholes have a size corresponding to a desired power level.

10. The device of any of examples 8-9 wherein the oxygen limiting pinholes are configured to regulate oxygen provided to a cathode of a proton exchange membrane fuel cell to control electricity generated without regulation of water vapor.

11. In example 11, a device includes a container having an oxygen-to-water selectively permeable membrane and a chamber to hold a hydrogen generating fuel, and a proton exchange membrane fuel cell supported within the container between the oxygen-to-water selectively permeable membrane and the chamber positioned to receive oxygen transported across the oxygen-to-water selectively permeable membrane and hydrogen from the chamber.

12. The device of example 11 wherein the hydrogen generating fuel comprises a chemical hydride and a hydrogen rechargeable metal hydride.

13. The device of any of examples 11-12 wherein the oxygen-to-water selectively permeable membrane comprises a porous film loaded with an O2-selective silicone oil.

14. The device of example 13 wherein the porous film comprises polytetrafluorethylene (PTFE).

15. The device of example 14 wherein the porous film comprises pore structures having micrometer and sub-micrometer size.

16. The device of example 15 wherein the silicone oil comprises polydimethylsiloxane or dimethylpolysiloxane.

17. The device of any of examples 11-16 and further comprising a plate supporting the oxygen-to-water selectively permeable membrane, the plate having an array of oxygen limiting pinholes sized to limit oxygen supplied to a cathode of the proton exchange membrane fuel cell, wherein the oxygen limiting pinholes have a size corresponding to a desired power level.

18. In example 18, a method includes exposing the cathode of a proton exchange membrane fuel cell to oxygen that is transported from ambient across an oxygen-to-water selectively permeable membrane, such that water vapor transport across the oxygen-to-water selectively permeable membrane is limited, providing hydrogen to an anode of the fuel cell from a chamber containing a chemical hydride, reacting the oxygen and hydrogen to produce electricity and water vapor, and providing the generated water vapor to the chemical hydride to cause the chemical hydride to generate more hydrogen.

19. The method of example 18 wherein the oxygen-to-water selectively permeable membrane comprises a silicone oil infused porous membrane having a selectivity greater than 4.

20. The method of any of examples 18-19 and further comprising relieving excess hydrogen pressure in the chamber via a relief valve.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
   a container;
   an oxygen-to-water selectively permeable membrane supported within an outer case wall of the container, the oxygen-to-water selectively permeable membrane including an O2-selective substance applied to a porous substrate;
   a chamber disposed in the container to hold a hydrogen generating fuel; and
   a proton exchange membrane fuel cell supported within the container between the oxygen-to-water selectively permeable membrane and the chamber;
   wherein the oxygen-to-water selectively permeable membrane is disposed between the proton exchange membrane fuel cell and a plurality of ambient openings in the outer case wall to transport oxygen and restrict water vapor flow between the proton exchange membrane fuel cell and ambient.

2. The device of claim 1 wherein the hydrogen generating fuel comprises a chemical hydride and a metal hydride.

3. The device of claim 2 wherein the hydrogen generating fuel further comprises a Lewis acid.

4. The device of claim 1 wherein the oxygen-to-water selectively permeable membrane comprises a porous film loaded with an O2-selective silicone oil.

5. The device of claim 4 wherein the porous film comprises polytetrafluorethylene (PTFE).

6. The device of claim 5 wherein the porous film comprises pore structures having micrometer and sub-micrometer size.

7. The device of claim 6 wherein the silicone oil comprises polydimethylsiloxane or dimethylpolysiloxane.

8. The device of claim 1 wherein the plurality of ambient openings in the outer case wall includes an array of oxygen limiting pinholes adjacent to the oxygen-to-water selectively permeable membrane, the array of oxygen limiting pinholes sized to transport oxygen and further restrict water vapor supplied to a cathode side of the fuel cell proton exchange membrane electrode assembly.

9. The device of claim 8 wherein the oxygen limiting pinholes have a size corresponding to a desired power level.

10. The device of claim 8 wherein the oxygen limiting pinholes are configured to regulate oxygen provided to a cathode of a proton exchange membrane fuel cell to control electricity generated without regulation of water vapor.

11. A device comprising:
    a container having an oxygen-to-water selectively permeable membrane and a chamber to hold a hydrogen generating fuel, the container including an outer case wall including a plurality of ambient opening, the oxygen-to-water selectively permeable membrane supported within the outer case wall and including an O2-selective substance applied to a porous substrate, the oxygen-to-water selectively permeable membrane and plurality of ambient openings to transport oxygen and restrict water vapor flow between the container and ambient; and
    a proton exchange membrane fuel cell supported within the container between the oxygen-to-water selectively permeable membrane and the chamber positioned to receive oxygen transported across the oxygen-to-water selectively permeable membrane and hydrogen from the chamber; wherein the oxygen-to-water selectively permeable membrane is disposed between the proton exchange membrane fuel cell and the plurality of ambient openings in the outer case wall.

12. The device of claim 11 wherein the hydrogen generating fuel comprises a chemical hydride and a hydrogen rechargeable metal hydride.

13. The device of claim 11 wherein the oxygen-to-water selectively permeable membrane comprises a porous film loaded with an O2-selective silicone oil.

14. The device of claim 13 wherein the porous comprises polytetrafluorethylene (PTFE).

15. The device of claim 14 wherein the porous film comprises pore structures having micrometer and sub-micrometer size.

16. The device of claim 15 wherein the silicone oil comprises polydimethylsiloxane or dimethylpolysiloxane.

17. The device of claim 11 wherein the plurality of ambient openings in the outer case wall includes an array of oxygen limiting pinholes adjacent to the oxygen-to-water selectively permeable membrane, the array of oxygen limiting pinholes sized to transport oxygen and further restrict water vapor supplied to a cathode of the proton exchange membrane fuel cell, wherein the oxygen limiting pinholes have a size corresponding to a desired power level.

18. A method comprising:
    exposing the cathode of a proton exchange membrane fuel cell to oxygen that is transported through a plurality of ambient openings in an outer case wall and of a container across an oxygen-to-water selectively permeable membrane disposed between the proton exchange membrane fuel cell and the plurality of ambient openings in the outer case wall, the oxygen-to-water selectively permeable membrane including an O2-selective substance applied to a porous substrate such that water vapor transported across the oxygen-to-water selectively permeable membrane is limited;
    providing hydrogen to an anode of the fuel cell from a chamber containing a chemical hydride;
    reacting the oxygen and hydrogen to produce electricity and water vapor; and
    providing the generated water vapor to the chemical hydride to cause the chemical hydride to generate more hydrogen, wherein the proton exchange membrane fuel cell, the oxygen-to-water selectively permeable membrane, and the chamber are supported within the container.

19. The method of claim 18 wherein the oxygen-to-water selectively permeable membrane comprises a silicone oil infused porous membrane having a selectivity greater than 4.

20. The method of claim 18 and further comprising relieving excess hydrogen pressure in the chamber via a relief valve.

* * * * *